(12) United States Patent
Du et al.

(10) Patent No.: US 11,778,327 B2
(45) Date of Patent: Oct. 3, 2023

(54) IMAGE RECONSTRUCTION METHOD AND DEVICE

(71) Applicant: HANGZHOU EZVIZ SOFTWARE CO., LTD., Hangzhou (CN)

(72) Inventors: Bin Du, Hangzhou (CN); Shijie Ma, Hangzhou (CN); Zhixiang Yang, Hangzhou (CN)

(73) Assignee: HANGZHOU EZVIZ SOFTWARE CO., LTD., Hangzhou (CN)

( * ) Notice: Subject to any disclaimer, the term of this patent is extended or adjusted under 35 U.S.C. 154(b) by 0 days.

(21) Appl. No.: 18/004,209

(22) PCT Filed: Jul. 7, 2021

(86) PCT No.: PCT/CN2021/105023
§ 371 (c)(1),
(2) Date: Jan. 4, 2023

(87) PCT Pub. No.: WO2022/007851
PCT Pub. Date: Jan. 13, 2022

(65) Prior Publication Data
US 2023/0269475 A1    Aug. 24, 2023

(30) Foreign Application Priority Data

Jul. 8, 2020  (CN) .......................... 202010649902.3

(51) Int. Cl.
*H04N 23/695* (2023.01)
*H04N 23/67* (2023.01)
(Continued)

(52) U.S. Cl.
CPC ......... *H04N 23/695* (2023.01); *G06T 3/4007* (2013.01); *G06T 5/50* (2013.01);
(Continued)

(58) Field of Classification Search
None
See application file for complete search history.

(56) References Cited

U.S. PATENT DOCUMENTS

| 2002/0075258 A1* | 6/2002 | Park | H04N 9/8047 |
| | | | 348/E7.086 |
| 2010/0238327 A1* | 9/2010 | Griffith | H04N 5/2628 |
| | | | 348/240.99 |

(Continued)

FOREIGN PATENT DOCUMENTS

| CN | 104200450 | 12/2014 |
| CN | 106254777 | 12/2016 |

(Continued)

OTHER PUBLICATIONS

Haiming et al., "Basic Research on the Key Technology of Image Superresolution Reconstruction", *University of Science and Technology of China*, a dissertation for doctor's degree, Jul. 12, 2013, 144 pages (English Abstract Provided).

(Continued)

*Primary Examiner* — Quan Pham
(74) *Attorney, Agent, or Firm* — NORTON ROSE FULBRIGHT US LLP (57) ABSTRACT

Embodiments of the present application provides an image reconstruction method and device. The method comprises: when a long-focus image set acquisition condition is met, driving the pan-tilt platform of a binocular long-focus and short-focus pan-tilt camera to rotate throughout a field-of-view range, obtaining one long-focus image every preset horizontal and/or vertical angle, and constituting a first long-focus image set with all long-focus images acquired throughout the field-of-view range; receiving a zoom request, and performing interpolating on the first short-focus image currently acquired to obtain a second short-focus image that meets the zoom request; downsampling each (Continued)

--- when a preset long-focus image set acquisition condition is met, driving the pan-tilt platform of a binocular long-focus and short-focus pan-tilt camera to rotate throughout a field-of-view range, obtaining one long-focus image every preset horizontal and/or vertical angle, and constituting a first long-focus image set with all long-focus images acquired throughout the field-of-view range, wherein adjacent long-focus images overlap partially — 201 receiving a zoom request, and performing interpolating on a first short-focus image currently acquired by the binocular long-focus and short-focus pan-tilt camera to obtain a second short-focus image that meets the zoom request — 202 downsampling each long-focus image in the first long-focus image set to obtain a second long-focus image set, wherein a target in each long-focus image in the second long-focus image set and the same target in the second short-focus image are matched in size — 203 dividing the second short-focus image into blocks, searching, for each of the divided blocks, all long-focus images in the second long-focus image set for a matching block — 204 fusing each of the divided blocks in the second short-focus image with the matching block for this divided block to obtain a reconstructed short-focus image — 205 long-focus image in the first long-focus image set to obtain a second long-focus image set; dividing the second short-focus image into blocks, searching, for each of the divided blocks, all long-focus images in the second long-focus image set for a matching block; fusing each of the divided blocks in the second short-focus image with the matching block for this divided block to obtain a reconstructed short-focus image. The embodiments of the present application not only retain the advantage of a large field-of-view of the short-focus image, but also improves the definition.

11 Claims, 3 Drawing Sheets

(51) Int. Cl.
*G06T 3/40* (2006.01)
*G06T 7/11* (2017.01)
*G06V 10/74* (2022.01)
*G06T 5/50* (2006.01)
*H04N 23/45* (2023.01)

(52) U.S. Cl.
CPC .............. *G06T 7/11* (2017.01); *G06V 10/761* (2022.01); *H04N 23/45* (2023.01); *H04N 23/67* (2023.01); *G06T 2207/20221* (2013.01); *G06T 2207/20224* (2013.01)

(56) References Cited

U.S. PATENT DOCUMENTS

| | | | |
|---|---|---|---|
| 2016/0050374 A1* | 2/2016 | Shabtay | H04N 23/45 |
| | | | 348/240.3 |
| 2018/0070018 A1 | 3/2018 | Bian et al. | |
| 2018/0184010 A1 | 6/2018 | Cohen et al. | |
| 2019/0080186 A1 | 3/2019 | Zhai et al. | |
| 2019/0121216 A1* | 4/2019 | Shabtay | H04N 23/695 |
| 2019/0259139 A1 | 8/2019 | Ichihashi et al. | |
| 2020/0402206 A1* | 12/2020 | Ichihashi | G06T 7/0002 |
| 2023/0065883 A1* | 3/2023 | Ilan | G06T 3/4038 |

FOREIGN PATENT DOCUMENTS

| | | |
|---|---|---|
| CN | 108401104 | 8/2018 |
| CN | 109285136 | 1/2019 |
| CN | 110378850 | 10/2019 |
| CN | 110868541 | 3/2020 |
| CN | 111818262 | 10/2020 |

OTHER PUBLICATIONS

International Search Report and Written Opinion issued in corresponding PCT Application No. PCT/CN2021/105023, dated Oct. 12, 2021 (English translation provided).

* cited by examiner

IMAGE RECONSTRUCTION METHOD AND DEVICE

CROSS REFERENCE TO RELATED APPLICATIONS

The present application is a national phase under 35 U.S.C. § 371 of International Application No. PCT/CN2021/105023, filed Jul. 7, 2021, which claims the benefit of priority to Chinese patent application No. 202010649902.3 filed with the China National Intellectual Property Administration on Jul. 8, 2020 and entitled "Image Reconstruction Method and Device", each of which are incorporated herein by reference in their entirety.

TECHNICAL FIELD

The present application relates to the technical field of image processing, in particular to an image reconstruction method and device.

BACKGROUND

Due to a large field-of-view angle of a short-focus camera and a small field-of-view angle of a long-focus camera, the definition of a long-focus image is high and the definition of a short-focus image is low when the images are acquired with an image sensor of the same size. In order to fuse the images with two focal lengths to achieve a zooming effect, a software method is needed to improve the spatial resolution of the image, that is, the super-resolution algorithm.

Super-resolution refers to the reconstruction of low-resolution images into corresponding high-resolution images. The existing super-resolution algorithm generally includes a single-frame super-resolution algorithm and a super-resolution algorithm using high-definition reference images. Single-frame super-resolution algorithm has limited effects on image enhancement and generally has high algorithm complexity.

The super-resolution method using high-definition reference images takes full advantages of reference images and images to be processed to obtain high-quality images through synthetization. In the existing solution, long-focus and short-focus dual-focus cameras are used to acquire both the large-field wide-angle image and the high-definition long-focus image, then the high-resolution information of the long-focus image is migrated to the repairable area of the short-focus image using the overlapping area of the fields of view of the wide-angle and long-focus cameras, and the digital zoom is performed based on the repaired short-focus image. This method is suitable for scenarios where the overlapping area of an short-focus image and a long-focus image is similar to other areas. However, if there are significant differences between different parts of the image, the enhancement through local information is not significant or even causes errors, resulting in worse picture effect.

SUMMARY

Embodiments of the present application provide an image reconstruction method and device to improve the definition of the short-focus image while preserving the advantages of the large field-of-view of the short-focus image acquired by the binocular long-focus and short-focus pan-tilt camera.

The technical solution of the embodiment of the present application is implemented as follows.

An image reconstruction method is provided, including:

when a preset long-focus image set acquisition condition is met, driving a pan-tilt platform of a binocular long-focus and short-focus pan-tilt camera to rotate throughout a field-of-view range, obtaining one long-focus image every preset horizontal and/or vertical angle, and constituting a first long-focus image set with all long-focus images acquired throughout the field-of-view range, wherein adjacent long-focus images overlap partially;

receiving a zoom request, and performing interpolating on a first short-focus image currently acquired by the binocular long-focus and short-focus pan-tilt camera to obtain a second short-focus image that meets the zoom request;

downsampling each long-focus image in the first long-focus image set to obtain a second long-focus image set, wherein a target in each long-focus image in the second long-focus image set and the same target in the second short-focus image are matched in size;

dividing the second short-focus image into blocks, and searching, for each of the divided blocks, all long-focus images in the second long-focus image set for a matching block;

fusing each of the divided blocks in the second short-focus image with the matching block for this divided block to obtain a reconstructed short-focus image;

wherein the binocular long-focus and short-focus pan-tilt camera is composed of a short-focus camera and a long-focus camera, relative positions of the short-focus camera and the long-focus camera are fixed, and the short-focus camera and the long-focus camera rotate simultaneously with the pan-tilt platform.

Wherein, fusing each of the divided blocks in the second short-focus image with the matching block for this divided block includes:

extracting a high-frequency component of the matching block for each of the divided blocks, and fusing each of the divided blocks with the high-frequency component of the matching block for this divided block.

Wherein, fusing each of the divided blocks in the second short-focus image with the high-frequency component of the matching block for this divided block includes:

assigning a fusion weight for each matching block according to a principle that the larger a similarity between the matching block and its corresponding divided block is, the larger the fusion weight of the matching block is;

multiplying the high-frequency component of each matching block by the corresponding fusion weight to obtain a result and then superimposing the result with the corresponding divided block, to obtain the reconstructed short-focus image.

Wherein, assigning the fusion weight for each matching block according to the principle that the larger a similarity between the matching block and its corresponding divided block is, the larger the fusion weight of the matching block is includes:

calculating $$W_k = \left(\frac{E_k}{E_{min}}\right)^{-\alpha},$$

wherein $W_K$ is a fusion weight of a matching block for a kth divided block of the second short-focus image, $$E_k = \frac{1}{S_k},$$

$S_K$ is a similarity between the kth divided block of the second short-focus image and the matching block, $$E_{min} = \frac{1}{S_{max}},$$

$S_{max}$ is a maximum similarity among similarities between all divided blocks of the second short-focus image and the matching blocks for the divided blocks, and $\alpha$ is a preset value.

Wherein, searching, for each of the divided blocks, all long-focus images in the second long-focus image set for the matching block includes:

searching, for each of the divided blocks of the second short-focus image, all the long-focus images in the second long-focus image set for a matching block that matches the divided block in position according to an angle of the pan-tilt platform when the first short-focus image is acquired, an angle of the pan-tilt platform when each long-focus image in the first long-focus image set is acquired and a field-of-view difference between a short-focus lens and a long-focus lens; or searching, for each of the divided blocks, all the long-focus images in the second long-focus image set for a matching block having a highest image similarity with the divided block by using a preset template matching algorithm.

Wherein, extracting the high-frequency component of the matching block for each of the divided blocks in the second short-focus image includes:

downsampling the long-focus image in which the matching block is located in the second long-focus image set such that a resolution of the downsampled image is the same as that of the first short-focus image, then performing interpolating on the downsampled image such that a resolution of the interpolated image is equal to that of the second short-focus image, and subtracting a corresponding block of the matching block in the interpolated image from the matching block to obtain the high-frequency component of the matching block.

Wherein, the preset long-focus image set acquisition condition is met in a case including:

when the binocular long-focus and short-focus pan-tilt camera is started, or, when a difference between a photometric value of a currently acquired short-focus image and a photometric value of a long-focus image in a last acquired long-focus image set is greater than a preset first threshold, or when an image similarity between divided blocks at same positions in the currently acquired short-focus image and in a long-focus image in the last acquired long-focus image set is less than a preset second threshold.

Wherein, after the preset long-focus image set acquisition condition is met and before the pan-tilt platform of the binocular long-focus and short-focus pan-tilt camera is driven to rotate throughout the field-of-view range, the method further includes:

determining whether there is no alarm target in a currently acquired short-focus image and there is currently no image preview requirement, wherein it is determined that there is no alarm target in the currently acquired short-focus image and there is currently no image preview requirement; and when it is determined that there is an alarm target in the currently acquired short-focus image or there is currently an image preview requirement, waiting for a preset time, and then returning to the action of determining whether there is no alarm target in the currently acquired short-focus image and there is currently no image preview requirement.

An image reconstruction device is provided, which includes a memory and a processor that can access the memory having stored therein instructions which, when executed by the processor, cause the processor to implement steps of any method as described above.

A binocular long-focus and short-focus pan-tilt camera is provided, which includes a short-focus camera, a long-focus camera and a pan-tilt platform, wherein relative positions of the short-focus camera and the long-focus camera are fixed, and the short-focus camera and the long-focus camera rotate simultaneously with the pan-tilt platform; and each of the short-focus camera and the long-focus camera has an interface to communicate with the image reconstruction device, and the short-focus camera and the long-focus camera send an original short-focus image and an original long-focus image respectively acquired by the short-focus camera and the long-focus camera to the image reconstruction device through the respective communication interfaces.

In the present application, for each of divided blocks in a short-focus image, a matching block is searched for in a long-focus image, and then the matching block is fused with the divided block in a short-focus image to obtain a reconstructed short-focus image, thereby the reconstructed short-focus image retains the advantages of the large field-of-view of the short-focus image and has improved definition.

BRIEF DESCRIPTION OF DRAWINGS

In order to more clearly describe the technical solution of the embodiments of the present application and the prior art, drawings needed in the embodiments and the prior art will be briefly described below. Obviously, the drawings described below are for only some embodiments of the present application, one of ordinary skills in the art can also obtain other drawings based on the drawings illustrated herein.

DETAILED DESCRIPTION

In order to make objectives, technical solutions and advantages of the present application more apparent, the present application now will be described in detail with reference to the accompanying drawings and by way of examples. Obviously, the embodiments described herein are only some of the embodiments of the present application instead of all of them. All other embodiments obtained by those skilled in the art based on the embodiments in the present application fall within the protection scope of the present application.

The present application is explained in further detail below in conjunction with the drawings and the detailed description.

For ease of understanding, the following explanations are given first:

Focal length: the distance from the center of the lens to the focus where light is focused. Generally, more than 6 mm (millimeters) is called the long-focus, and less than 6 mm is called the short-focus.

Continuous rotation: it can continuously rotate in a specified direction without position limitation.

Image stitching and fusion refers to the merging of two images with a common part into one image to expand the field-of-view angle and/or improve the definition. For example, in the monitoring scenario of a binocular long-focus and short-focus pan-tilt camera, according to the common part of the long-focus image and the short-focus image, the common part in the short-focus image is replaced by the long-focus image, so as to take both advantages of the large field-of-view angle of the short-focus camera and the high definition of the long-focus camera. However, as the picture is enlarged, the low definition problem of the part from the short-focus image becomes more and more obvious. To solve this problem, the present application provides the following solutions.

An embodiment of the present application firstly provides a binocular long-focus and short-focus pan-tilt camera, wherein the pan-tilt platform can rotate horizontally and vertically. There are two lenses and two sensors. A short-focus sensor and a short-focus lens form a short-focus camera. The short-focus lens has a larger field-of-view and can cover a larger monitoring range, while a long-focus sensor and a long-focus lens form a long-focus camera. The long-focus lens has a smaller field-of-view but a higher definition.

In one example of the binocular long-focus and short-focus pan-tilt camera provided by the embodiment of the present application, the relative positions of the short-focus lens and the long-focus lens are fixed, and the optical axes thereof are parallel and as close as possible to each other. The pan-tilt platform of the binocular long-focus and short-focus pan-tilt camera can rotate continuously horizontally, or vertically from 0 to 90 degrees, where the horizontal direction can be parallel to the base plane and the vertical direction can be perpendicular to the base plane, and the base plane can be any plane. In this case, the horizontal field-of-view angle of the short-focus lens is 120 degrees, the vertical field-of-view angle is 68 degrees, and the horizontal field-of-view angle of the long-focus lens is 30 degrees, the vertical field-of-view angle is 17 degrees. And there is a gyroscope to detect the position of the pan-tilt platform. The resolutions of long-focus and short-focus sensors can be the same or different. However, in order to ensure the resolution of the picture using the long-focus lens, that is, to make the resolution of the picture using the long-focus lens reach a preset resolution threshold, it is recommended to ensure that the resolution of the long-focus sensor reaches or exceeds 1080P, that is, to ensure that the resolution of the picture using the long-focus lens reaches or exceeds 1080P.

Figure 1:
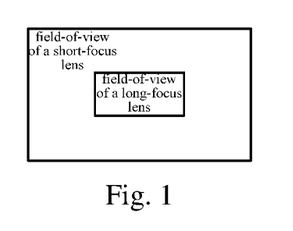
FIG. 1 shows the field-of-view relationship between the short-focus lens and the long-focus lens of a binocular long-focus and short-focus pan-tilt camera provided in the embodiment of the present application.

The field-of-view relationship between the short-focus lens and the long-focus lens remains unchanged in FIG. 1, that is, the field-of-view relationship between the short-focus lens and the long-focus lens remains as shown in FIG. 1, regardless of how the pan-tilt platform rotates. As shown in FIG. 1, the area contained in the small rectangle at the center is the field-of-view of the long-focus lens, while the area contained in the large outside rectangle outside is the field-of-view of the short-focus lens.

Figure 2:
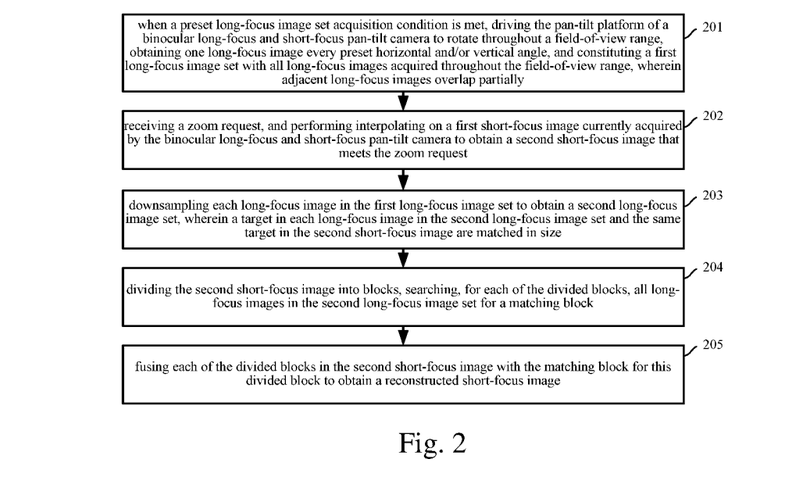
FIG. 2 shows the flow chart of an image reconstruction method provided in an embodiment of the present application.

FIG. 2 shows the flow chart of an image reconstruction method provided in an embodiment of the present application. The specific steps are as follows:

Step 201: when a preset long-focus image set acquisition condition is met, driving the pan-tilt platform of a binocular long-focus and short-focus pan-tilt camera to rotate throughout a field-of-view range, obtaining one long-focus image every preset horizontal and/or vertical angle, and constituting a first long-focus image set with all long-focus images acquired throughout the field-of-view range, wherein adjacent long-focus images overlap partially.

Step 202: receiving a zoom request, and performing interpolating on a first short-focus image currently acquired by the binocular long-focus and short-focus pan-tilt camera to obtain a second short-focus image that meets the zoom request.

Step 203: downsampling each long-focus image in the first long-focus image set to obtain a second long-focus image set, wherein a target in each long-focus image in the second long-focus image set and the same target in the second short-focus image are matched in size.

Because the field-of-view of the long-focus lens is smaller than that of the short-focus lens, that is, the focal length of the long-focus lens is longer than that of the short-focus lens, according to the principle of optical imaging, the size of a target in the long-focus image is larger than that in the short-focus image. To fuse the long-focus and short-focus images, the long-focus image in the first long-focus image set must be reduced in size so that the size of the same target in the long-focus image is the same as that of the target in the second short-focus image.

Step 204: dividing the second short-focus image into blocks, searching, for each of the divided blocks, all long-focus images in the second long-focus image set for a matching block.

Step 205: fusing each of the divided blocks in the second short-focus image with the matching block for this divided block to obtain a reconstructed short-focus image.

Wherein the binocular long-focus and short-focus pan-tilt camera is composed of a short-focus camera and a long-focus camera, the relative positions of the short-focus camera and the long-focus camera are fixed, and the short-focus camera and the long-focus camera rotate simultaneously with the pan-tilt platform.

Through the above mentioned embodiment, for each of the divided blocks in a short-focus image, a matching block is searched for in a long-focus image, and then the matching block is fused with the divided block in a short-focus image to obtain a reconstructed short-focus image, thereby the reconstructed short-focus image retains the advantages of the large field-of-view of the short-focus image and has improved definition.

In an embodiment, in Step 205, fusing each of the divided blocks in the second short-focus image with the matching block for this divided block can include: extracting the high-frequency component of the matching block for each of the divided blocks in the second short-focus image, and fusing each of the divided blocks in the second short-focus image with the high-frequency component of the matching block for this divided block.

Wherein, the high-frequency component can refer to the image information in the matching block whose frequency is higher than a preset frequency threshold. Understandably, the image can be considered as a superimposition of image information of different frequencies. The higher the frequency, the greater the change of image information caused by spatial changes. On the contrary, the lower the frequency, the smaller the change of image information caused by spatial change. Exemplary, the frequency of image information contained in the solid color area of the image is lower, while the frequency of image information contained in the area with complex textures is higher. Therefore, the high-frequency component is often the contour or detail of the image.

Therefore, in the above embodiment, by extracting the high-frequency component of the matching block, the contours or details in the long-focus image are retained. The high-frequency component of the matching block is fused with the divided block in the second short-focus image, so that the defect of unclear details in the short-focus image can be remedied, and the definition of the reconstructed short-focus image is improved.

In an embodiment, fusing each of the divided blocks in the second short-focus image with the high-frequency component of the matching block for this divided block can include: calculating the fusion weight for each matching block according to the principle that the larger a similarity between the matching block and its corresponding divided block is, the larger the fusion weight of the matching block is; multiplying the high-frequency component of each matching block by the corresponding fusion weight to obtain a result and then superimposing the result with the corresponding divided block to obtain the reconstructed short-focus image.

In different application scenarios, the principle that the larger a similarity between the matching block and its corresponding divided block is, the larger the fusion weight of the matching block is can refer to different principles. At that time, the fusion weight should be positively related to the similarity. Exemplary, the relationship between the fusion weight and the similarity can be as follows:

$$W_k = aS_k + b$$

Wherein, $W_k$ is the fusion weight of the matching block for the kth divided block of the second short-focus image, $S_k$ is the similarity between the kth divided block of the second short-focus image and the matching block, a and b are preset values, and a is greater than 0.

In the above embodiment, when the similarity between the matching block and its corresponding divided block is higher, the weight assigned to the matching block is larger, so that when the long-focus image is similar to the short-focus image, the difference can be eliminated, while when there is a difference between the long-focus image and the short-focus image, such as when an object enters or leaves, the difference can be emphasized to avoid reconstruction errors.

In an embodiment, calculating the fusion weight for each matching block according to the principle that the larger a similarity between the matching block and its corresponding divided block is, the larger the fusion weight of the matching block is can include:
calculating $$W_k = \left(\frac{E_k}{E_{min}}\right)^{-\alpha}$$

wherein $W_K$ is the fusion weight of the matching block for the kth divided block of the second short-focus image, $$E_k = \frac{1}{S_k},$$

$S_K$ is the similarity between the kth divided block of the second short-focus image and the matching block, $$E_{min} = \frac{1}{S_{max}},$$

$S_{max}$ is the maximum similarity among the similarities between all divided blocks of the second short-focus image and the matching blocks for the divided blocks, and $\alpha$ is a preset value. And $\alpha$ is greater than 0. Exemplary, a can be 0.2, 0.5, 1, 1.2 and so on.

In the above embodiment, the calculation manner for determining the fusion weight of the matching block based on the similarity between the divided block and the matching block is given. Through this manner, the fusion weight calculated can be normalized, which is convenient for subsequent calculation and processing.

In an embodiment, in Step 204, searching, for each of the divided blocks, all long-focus images in the second long-focus image set for a matching block can include: searching, for each of the divided blocks of the second short-focus image, all the long-focus images in the second long-focus image set for a matching block that matches the divided block in position according to the angle of the pan-tilt platform when the first short-focus image is acquired, the angle of the pan-tilt platform when each long-focus image in the first long-focus image set is acquired, and the field-of-view difference between the short-focus lens and the long-focus lens; or, searching, for each of the divided blocks, all the long-focus images in the second long-focus image set for a matching block with the highest image similarity with the divided block by using a preset template matching algorithm.

The matching block with a matched position can refer to that the position in the real space represented by the matching block matches the position in the real space represented by the divided block. The spatial position represented by an image block is the spatial position reflected by the picture in the image block. It is understandable that in theory the divided block and matching block corresponding to the divided block should be obtained by taking pictures of the same area, so the matching block corresponding to the divided block can be determined by searching for a matching block that matches the divided block in position.

Because the angle of the pan-tilt platform when the first short-focus image is acquired, the angle of the pan-tilt platform when each long-focus image in the first long-focus image set is acquired, and the field-of-view difference between the short-focus lens and the long-focus lens can reflect the relative relationship between the spatial position represented by each image block in the first short-focus image and the spatial position represented by each image block in the first long-focus image, and the second short-focus image and the second long-focus image are obtained based on the first short-focus image and the first long-focus image, respectively, all the long-focus images in the second long-focus image set can be searched to obtain a matching block with a matched position according to the angle of the pan-tilt platform when the first short-focus image is acquired, the angle of the pan-tilt platform when each long-focus image in the first long-focus image set is acquired, and the field-of-view difference between the short-focus lens and the long-focus lens.

Furthermore, the preset template matching algorithm can be any template matching algorithm, including, but not limited to, MAD (Mean Absolute Differences), SAD (Sum of Absolute Differences), SSD (Sum of Squared Differences), MSD (Mean Square Differences), and NCC (Normalized Cross Correlation), etc.

It is understandable that since in theory the divided block and the matching block corresponding to this divided block should be obtained by taking pictures of the same area, the image similarity between the divided block and the matching block corresponding to this divided block is higher than that between the divided block and the unmatched block, so that the matching block corresponding to the divided block can be determined by searching for a matching block with the highest image similarity with the divided block.

In the above embodiment, matching blocks are searched accurately for each of the divided blocks of the second short-focus image based on the position matching relationship or the comparison of the image similarity.

In an embodiment, extracting the high-frequency component of the matching block for each of the divided blocks in the second short-focus image can include: downsampling the long-focus image in which the matching block is located in the second long-focus image set such that the resolution of the downsampled image is the same as that of the first short-focus image, then performing interpolating on the downsampled image such that the resolution of the interpolated image is equal to that of the second short-focus image, and subtracting the corresponding block of the matching block in the interpolated image from the matching block to obtain the high-frequency component of the matching block.

Wherein, subtracting the corresponding block of the matching block in the interpolated image from the matching block can refer to subtracting, from the pixel value of the pixel for each pixel in the matching block, the pixel value of the corresponding point in the interpolated image at a position same as that of the pixel. Exemplary, suppose that the pixel value of the pixel whose pixel coordinates are (h, v) in the matching block is P1. Since the resolution of the interpolated image is equal to the resolution of the second short-focus image, there must be a corresponding point whose pixel coordinates are also (h, v) in the interpolated image. If the pixel value of this corresponding point is P2, then P1-P2 can be used as a new pixel value of the pixel whose pixel coordinates are (h, v) in the matching block.

It can be understood that since the second long-focus image contains relatively rich image details, the second long-focus image contains rich high-frequency components, while the image information contained in the second short-focus image is all (or most) low-frequency components, so it can be considered that the matching block contains both high-frequency components and low-frequency components, while the corresponding block contains only low-frequency components (or contains low-frequency components and a small number of high-frequency components). Therefore, the low-frequency information contained in the matching block can be removed by subtracting the corresponding block of the matching block in the interpolated image from the matching block, so as to extract the high-frequency component in the matching block.

Therefore, through this embodiment, the high-frequency component of the matching block is accurately extracted.

In an embodiment, in Step 201, the preset long-focus image set acquisition condition is met in a case including: when the binocular long-focus and short-focus pan-tilt camera is started, or, when the difference between the photometric value of the currently acquired short-focus image and that of the long-focus image in the last acquired long-focus image set is greater than a preset first threshold, or when the image similarity between divided blocks at same positions in the currently acquired short-focus image and in a long-focus image in the last acquired long-focus image set is less than a preset second threshold.

It can be understood that when the difference between the photometric value of the currently acquired short-focus image and that of a long-focus image in the last acquired long-focus image set is greater than the preset first threshold, it can be considered that the current ambient light changes compared with when the long-focus image set is acquired. When the image similarity between divided blocks at same positions in the currently acquired short-focus image and in a long-focus image in the last acquired long-focus image set is less than the preset second threshold, it can be considered that the current monitoring scenario changes compared with when the long-focus image set is acquired.

The captured images will be affected regardless whether the ambient light changes or the monitoring scenario changes. Therefore, the image information contained in the long-focus images in the long-focus image set cannot be used as a reference for short-focus image reconstruction. That is, when the ambient light changes or the monitoring scenario changes, the short-focus images cannot be accurately reconstructed according to the previously acquired long-focus image set, and the long-focus image set needs to be re-acquired.

Therefore, in the above embodiment, when the binocular long-focus and short-focus pan-tilt camera is started, or when the ambient light changes, or when the monitoring scenario changes, the long-focus image set is re-acquired, thus ensuring the accuracy of the short-focus image reconstruction.

In an embodiment, in Step 201, after the preset long-focus image set acquisition condition is met and before the pan-tilt platform of the binocular long-focus and short-focus pan-tilt camera is driven to rotate throughout the field-of-view range, the method can further include:

determining whether there is no alarm target in the currently acquired short-focus image and there is currently no image preview requirement;

when it is determined that there is no alarm target in the currently acquired short-focus image and there is currently no image preview requirement, driving the pan-tilt platform of the binocular long-focus and short-focus pan-tilt camera to rotate throughout the field-of-view range, obtaining one long-focus image every preset horizontal and/or vertical angle, and constituting the first long-focus image set with all the long-focus images acquired throughout the field-of-view range;

and, when it is determined that there is an alarm target in the currently acquired short-focus image or there is currently an image preview requirement, waiting for a preset time, and then returning to the action of determining whether there is no alarm target in the currently acquired short-focus image and there is currently no image preview requirement.

In the above embodiment, it is started to acquire the long-focus image set only when there is no alarm target in the currently acquired short-focus image and there is currently no image preview requirement, so as to avoid missing the alarm target and hindering the user's image preview requirement.

Figure 3:
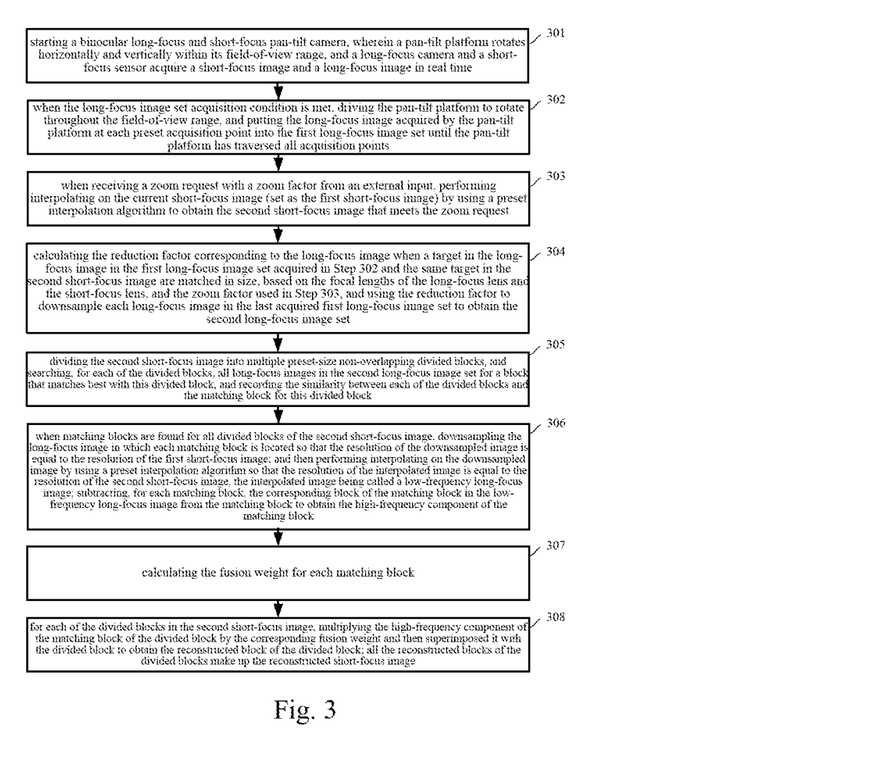
FIG. 3 shows the flow chart of an image reconstruction method provided in another embodiment of the present application.

FIG. 3 shows the flow chart of an image reconstruction method provided in another embodiment of the present application. The specific steps are as follows.

Step 301: starting a binocular long-focus and short-focus pan-tilt camera, wherein a pan-tilt platform rotates horizontally and vertically within its field-of-view range, and a long-focus camera and a short-focus sensor acquire a short-focus image and a long-focus image in real time.

Step 302: when the long-focus image set acquisition condition is met, driving the pan-tilt platform to rotate throughout the field-of-view range, and putting the long-focus image acquired by the pan-tilt platform at each preset acquisition point into the first long-focus image set until the pan-tilt platform has traversed all acquisition points.

The long-focus image set acquisition condition is preset. The long-focus image set acquisition condition is met in a case including: when the binocular long-focus and short-focus pan-tilt camera is started, when the ambient light brightness changes, and/or when the scenario content changes (for example, the position of the binocular long-focus and short-focus pan-tilt camera changes).

It can be determined whether the ambient light brightness changes by determining whether the difference between the photometric value of the currently acquired short-focus image and that of the long-focus image in the last acquired long-focus image set is greater than the preset first threshold.

It can be determined whether the scenario content changes by determining whether the image similarity between the currently acquired short-focus image and the divided block at a position same as that of a long-focus image in the last acquired long-focus image set is less than the preset second threshold.

If the initial position of the pan-tilt platform is zero, and the horizontal and vertical azimuth angles in this case are both 0, the preset acquisition points can be set as follows: one acquisition point at every 25 degrees horizontally and one acquisition point at every 12 degrees vertically from 0, or, one acquisition point at every 12.5 degrees horizontally and one acquisition point at every 6 degrees vertically from 0, other degrees are also possible, which is not limited in the present application.

Step 303: when receiving a zoom request with a zoom factor from an external input, performing interpolating on the current short-focus image (set as the first short-focus image) by using a preset interpolation algorithm to obtain the second short-focus image that meets the zoom request.

The interpolation algorithm is mature. The used algorithm is not limited in this embodiment, for example, bilinear interpolation, bicubic interpolation, or minimum curvature interpolation.

Step 304: calculating the reduction factor corresponding to the long-focus image when a target in the long-focus image in the first long-focus image set acquired in Step 302 and the same target in the second short-focus image are matched in size, based on the focal lengths of the long-focus lens and the short-focus lens, and the zoom factor used in Step 303, and using the reduction factor to downsample each long-focus image in the last acquired first long-focus image set to obtain the second long-focus image set.

Step 305: dividing the second short-focus image into multiple preset-size non-overlapping divided blocks, and searching, for each of the divided blocks, all long-focus images in the second long-focus image set for a block (i.e., a best matching block) that matches best with this divided block, and recording the similarity between each of the divided blocks and the matching block for this divided block.

Specifically, in this step, before searching for a matching block for each of the divided blocks, a long-focus image that overlaps in field-of-view with the second short-focus image is firstly selected in the second long-focus image set based on the angle of the pan-tilt platform when the first short-focus image is acquired and the angle of the pan-tilt platform when each long-focus image in the first long-focus image set is acquired. Then, for each of the divided blocks, the best matching block is searched for in the selected long-focus image. Wherein, the best matching block can refer to either a matching block with a matched position or a matching block with the highest image similarity. The matched position and image similarity have been described in the previous description and are not discussed here.

Figure 4:
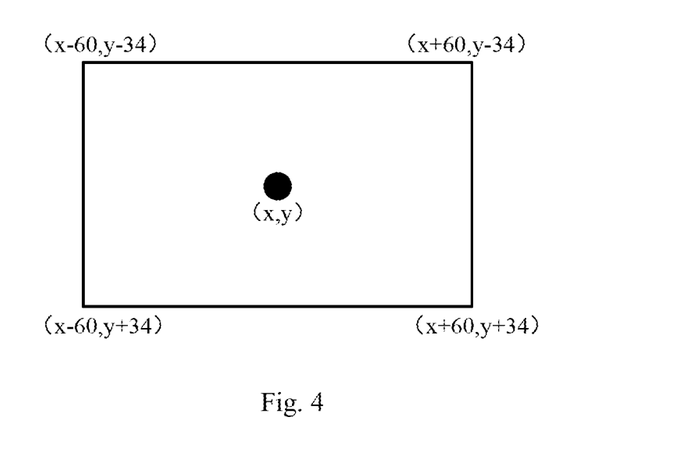
FIG. 4 is an example diagram illustrating the relationship between the field-of-view covered by a short-focus image and the position of a pan-tilt platform provided in an embodiment of the present application.

For example, if the position of the pan-tilt platform is (x, y) when the first short-focus image is acquired, x being the horizontal angle and y being the vertical angle, then the field-of-view covered by the first short-focus image is shown in FIG. 4. The long-focus image in this range of the field-of-view can be selected from the first long-focus image set.

In this step, one of the following methods can be used to search all long-focus images in the second long-focus image set for the best matching block.

1. Search, for each of the divided blocks of the second short-focus image, the selected long-focus image for a matching block that matches the divided block in position based on the angle of the pan-tilt platform when the first short-focus image is acquired, the angle of the pan-tilt platform when each long-focus image in the first long-focus image set is acquired and the field-of-view difference between the short-focus lens and the long-focus lens;

Matching in position means that the divided block and the matching block correspond to the same position in the monitoring scenario.

2. Search, for each of the divided blocks, the selected long-focus image for a matching block with the highest image similarity with the divided block by using a preset template matching algorithm.

Template matching algorithms can be MAD (Mean Absolute Difference), SAD (Sum of Absolute Difference), or SSD (Sum of Squared Difference), etc.

Step 306: when matching blocks are found for all divided blocks of the second short-focus image, downsampling the long-focus image in which each matching block is located so that the resolution of the downsampled image is equal to the resolution of the first short-focus image; and then performing interpolating on the downsampled image by using a preset interpolation algorithm so that the resolution of the interpolated image is equal to the resolution of the second short-focus image, the interpolated image being called a low-frequency long-focus image; subtracting, for each matching block, the corresponding block of the matching block in the low-frequency long-focus image from the matching block to obtain the high-frequency component of the matching block.

Step 307: calculating the fusion weight for each matching block $$W_k = \left(\frac{E_k}{E_{min}}\right)^{-\alpha},$$

wherein $W_K$ is the fusion weight of the matching block for the kth divided block of the second short-focus image, $$W_k = \left(\frac{E_k}{E_{min}}\right)^{-\alpha}$$

$S_K$ is the similarity between the kth divided block of the second short-focus image and the matching block, $$E_{min} = \frac{1}{S_{max}},$$

$S_{max}$ is the maximum similarity among the similarities between all divided blocks of the second short-focus image and the matching blocks for the divided blocks, and α is a preset value. Based on experience, generally, a can be 0.5, or values other than 0.5, such as 0.3, 1.2, 3, etc.

Step 308: for each of the divided blocks in the second short-focus image, multiplying the high-frequency component of the matching block of the divided block by the corresponding fusion weight and then superimposed it with the divided block to obtain the reconstructed block of the divided block. All the reconstructed blocks of the divided blocks make up the reconstructed short-focus image.

After obtaining the reconstructed short-focus image in Step 205 and Step 308, the reconstructed short-focus image can be fused with the currently acquired long-focus image to obtain a fused image finally output to the user. The fusion process is specifically as follows.

Suppose that the currently acquired long-focus image is a third long-focus image, then:

Step 01: calculating a reduction factor corresponding to the third long-focus image when a target in the third long-focus image and the same target in the reconstructed short-focus image are matched in size;

Step 02: performing a reduction process on the third long-focus image according to the calculated reduction factor, to obtain a fourth long-focus image;

Step 03: calculating the position of the fourth long-focus image in the reconstructed short-focus image when a target in the fourth long-focus image and the same target in the reconstructed short-focus image are matched in position according to the relative angle between the current long-focus lens and the short-focus lens;

Step 04: superimposing the fourth long-focus image on the reconstructed short-focus image according to the position of the fourth long-focus image in the reconstructed short-focus image, to obtain the fused image finally output to the user.

It can be seen that since the original short-focus image is processed by super-resolution reconstruction in the embodiment of the present application, the difference in definition between the picture in the middle and the picture around of the fused image finally output to the user is greatly reduced.

Figure 5:
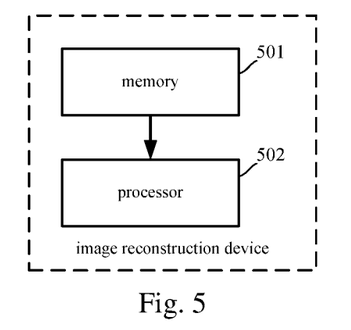
FIG. 5 is a schematic structural diagram of an image reconstruction device provided in an embodiment of the present application.

FIG. 5 is a schematic structural diagram of an image reconstruction device provided in an embodiment of the present application, which mainly includes a memory 501 and a processor 502 that can access the memory 501 having stored instructions therein which, when executed by the processor 502, cause the processor 502 to implement the steps, such as steps 201-205, or steps 301-308, of the method.

The present application also provides a binocular long-focus and short-focus pan-tilt camera which includes a short-focus camera, a long-focus camera and a pan-tilt platform, wherein the relative positions of the short-focus camera and the long-focus camera are fixed, and the short-focus camera and the long-focus camera rotate simultaneously with the pan-tilt platform. Further, each of the short-focus camera and the long-focus camera has an interface to communicate with the image reconstruction device, and the short-focus camera and the long-focus camera send the original short-focus image and the original long-focus image respectively acquired by the short-focus camera and the long-focus camera to the image reconstruction device through the respective communication interfaces.

In another embodiment of the present application, there is provided a computer readable storage medium having stored therein a computer program which, when executed by a processor, causes the processor to perform steps of any image reconstruction method described above.

In still another embodiment of the present invention, there is also provided a computer program product containing instructions that, when running on a computer, cause the computer to perform the image reconstruction method in any one of the embodiments described above.

The description is only for preferred embodiments of the present application, and is not intended to limit the present application. Any modifications, substitutions, improvements, etc., which are made within the spirit and principles of the present application, shall fall within the protection scope of the present application.

What is claimed is:

1. An image reconstruction method, comprising:
when a preset long-focus image set acquisition condition is met, driving a pan-tilt platform of a binocular long-focus and short-focus pan-tilt camera to rotate throughout a field-of-view range, obtaining one long-focus image every preset horizontal and/or vertical angle, and constituting a first long-focus image set with all long-focus images acquired throughout the field-of-view range, wherein adjacent long-focus images overlap partially;
receiving a zoom request, and performing interpolating on a first short-focus image currently acquired by the binocular long-focus and short-focus pan-tilt camera to obtain a second short-focus image that meets the zoom request;
downsampling each long-focus image in the first long-focus image set to obtain a second long-focus image set, wherein a target in each long-focus image in the second long-focus image set and the same target in the second short-focus image are matched in size;
dividing the second short-focus image into blocks, and searching, for each of the divided blocks, all long-focus images in the second long-focus image set for a matching block;
fusing each of the divided blocks in the second short-focus image with the matching block for this divided block to obtain a reconstructed short-focus image;
wherein the binocular long-focus and short-focus pan-tilt camera is composed of a short-focus camera and a long-focus camera, relative positions of the short-focus camera and the long-focus camera are fixed, and the short-focus camera and the long-focus camera rotate simultaneously with the pan-tilt platform.

2. The method of claim 1, wherein, fusing each of the divided blocks in the second short-focus image with the matching block for this divided block comprises:
    extracting a high-frequency component of the matching block for each of the divided blocks, and fusing each of the divided blocks with the high-frequency component of the matching block for this divided block.

3. The method of claim 2, wherein, fusing each of the divided blocks in the second short-focus image with the high-frequency component of the matching block for this divided block comprises:
    assigning a fusion weight for each matching block according to a principle that the larger a similarity between the matching block and its corresponding divided block is, the larger the fusion weight of the matching block is;
    multiplying the high-frequency component of each matching block by the corresponding fusion weight to obtain a result and then superimposing the result with the corresponding divided block, to obtain the reconstructed short-focus image.

4. The method of claim 3, wherein, assigning the fusion weight for each matching block according to the principle that the larger a similarity between the matching block and its corresponding divided block is, the larger the fusion weight of the matching block is comprises:
    calculating $$W_k = \left(\frac{E_k}{E_{min}}\right)^{-\alpha}$$

wherein $W_K$ is a fusion weight of a matching block for a kth divided block of the second short-focus image, $$E_k = \frac{1}{S_k},$$

$S_K$ is a similarity between the kth divided block of the second short-focus image and the matching block, $$E_{min} = \frac{1}{S_{max}},$$

$S_{max}$ is a maximum similarity among similarities between all divided blocks of the second short-focus image and the matching blocks for the divided blocks, and $\alpha$ is a preset value.

5. The method of claim 1, wherein, searching, for each of the divided blocks, all long-focus images in the second long-focus image set for the matching block comprises:
    searching, for each of the divided blocks of the second short-focus image, all the long-focus images in the second long-focus image set for a matching block that matches the divided block in position according to an angle of the pan-tilt platform when the first short-focus image is acquired, an angle of the pan-tilt platform when each long-focus image in the first long-focus image set is acquired and a field-of-view difference between a short-focus lens and a long-focus lens; or
    searching, for each of the divided blocks, all the long-focus images in the second long-focus image set for a matching block having a highest image similarity with the divided block by using a preset template matching algorithm.

6. The method of claim 2, wherein, extracting the high-frequency component of the matching block for each of the divided blocks in the second short-focus image comprises:
    downsampling the long-focus image in which the matching block is located in the second long-focus image set such that a resolution of the downsampled image is the same as that of the first short-focus image, then performing interpolating on the downsampled image such that a resolution of the interpolated image is equal to that of the second short-focus image, and subtracting a corresponding block of the matching block in the interpolated image from the matching block to obtain the high-frequency component of the matching block.

7. The method of claim 1, wherein, the preset long-focus image set acquisition condition is met in a case comprising:
    when the binocular long-focus and short-focus pan-tilt camera is started, or, when a difference between a photometric value of a currently acquired short-focus image and a photometric value of a long-focus image in a last acquired long-focus image set is greater than a preset first threshold, or when an image similarity between divided blocks at same positions in the currently acquired short-focus image and in a long-focus image in the last acquired long-focus image set is less than a preset second threshold.

8. The method of claim 1, wherein, after the preset long-focus image set acquisition condition is met and before the pan-tilt platform of the binocular long-focus and short-focus pan-tilt camera is driven to rotate throughout the field-of-view range, the method further comprises:
    determining whether there is no alarm target in a currently acquired short-focus image and there is currently no image preview requirement,
    when it is determined that there is no alarm target in the currently acquired short-focus image and there is currently no image preview requirement, driving the pan-tilt platform of the binocular long-focus and short-focus pan-tilt camera to rotate throughout the field-of-view range, obtaining one long-focus image every preset horizontal and/or vertical angle, and constituting the first long-focus image set with all long-focus images acquired throughout the field-of-view range; and
    when it is determined that there is an alarm target in the currently acquired short-focus image or there is currently an image preview requirement, waiting for a preset time, and then returning to the action of determining whether there is no alarm target in the currently acquired short-focus image and there is currently no image preview requirement.

9. An image reconstruction device, which comprises a memory and a processor that can access the memory having stored therein instructions which, when executed by the processor, cause the processor to implement steps of the method of claim 1.

10. A binocular long-focus and short-focus pan-tilt camera, which comprises a short-focus camera, a long-focus camera and a pan-tilt platform, wherein relative positions of the short-focus camera and the long-focus camera are fixed, and the short-focus camera and the long-focus camera rotate simultaneously with the pan-tilt platform; and
    each of the short-focus camera and the long-focus camera has an interface to communicate with the image reconstruction device of claim 9, and the short-focus camera and the long-focus camera send an original short-focus image and an original long-focus image respectively acquired by the short-focus camera and the long-focus camera to the image reconstruction device through the respective communication interfaces.

11. A non-transitory computer readable storage medium having stored therein a computer program which, when executed by a processor, causes the processor to perform steps of the method of claim 1.

* * * * *

UNITED STATES PATENT AND TRADEMARK OFFICE
CERTIFICATE OF CORRECTION

PATENT NO.        : 11,778,327 B2
APPLICATION NO.   : 18/004209
DATED             : October 3, 2023
INVENTOR(S)       : Bin Du et al.

Page 1 of 1

It is certified that error appears in the above-identified patent and that said Letters Patent is hereby corrected as shown below:

In the Specification

In Column 13, Line 12, please replace the equation with the following:

-- $E_k = \dfrac{1}{S_k}$ --

Signed and Sealed this
First Day of October, 2024

Katherine Kelly Vidal
*Director of the United States Patent and Trademark Office*